United States Patent [19]

Huss

[11] 4,179,118
[45] Dec. 18, 1979

[54] APPARATUS AND METHOD FOR RELEASABLY SECURING SHEET MATERIAL TO THE DRUM OF A DRUM-TYPE FACSIMILE MACHINE

[75] Inventor: Charles P. Huss, Oak Park Heights, Minn.

[73] Assignee: Minnesota Mining and Manufacturing Company, St. Paul, Minn.

[21] Appl. No.: 831,361

[22] Filed: Sep. 8, 1977

[51] Int. Cl.² ............................................. B65H 5/2
[52] U.S. Cl. ................................... 271/277; 271/3; 346/138
[58] Field of Search ................. 271/277, 82, 247, 3, 271/182, 183; 346/138, 132, 125, 126, 127, 128, ; 101/132, 132.5, 141, 142, 144

[56] References Cited

U.S. PATENT DOCUMENTS

| 2,701,177 | 2/1955 | Van Rennes | 346/138 X |
| 3,618,123 | 11/1971 | Buddendeck | 346/138 |
| 3,790,159 | 2/1944 | Hatzmann et al. | 271/277 X |
| 3,808,603 | 4/1974 | Degreve et al. | 346/138 |
| 3,854,715 | 12/1974 | Coleman | 271/277 |
| 3,906,512 | 9/1975 | Farlow | 346/138 |
| 4,026,242 | 5/1977 | Boschet | 271/277 X |

Primary Examiner—Bruce H. Stoner, Jr.
Attorney, Agent, or Firm—Cruzan Alexander; Donald M. Sell; Robert L. Marben

[57] ABSTRACT

Apparatus and method for a drum-type facsimile machine having a clamping mechanism for clamping an edge portion of sheet material to the drum and gripping arms operated for removal of the sheet material for gripping the paper to inhibit its movement with the drum. The gripping action is timed to be present during the unclamping of the sheet material. The clamping mechanism, when moved to its unclamped position, causes a limited rotation to be imparted to the drum to free the clamped edge portion of the sheet material from the drum for withdrawal from the apparatus by the operator.

7 Claims, 6 Drawing Figures

APPARATUS AND METHOD FOR RELEASABLY SECURING SHEET MATERIAL TO THE DRUM OF A DRUM-TYPE FACSIMILE MACHINE

BACKGROUND OF THE INVENTION

1. Field of the Invention

This invention relates to facsimile apparatus employing a rotating drum and more particularly to a method and apparatus for loading sheet material, such as copy paper or a document, onto the drum and unloading the sheet material from the drum.

2. Description of the Prior Art

Most facsimile systems utilize both a transmitting machine and a corresponding receiving machine for sending information between remote locations. Typically, a transmitting machine scans the contents of a document at a send location and transmits signals representative of the contents to a receiving machine at a receive location. The receiving machine receives the transmitted signals and produces an image of the document on a sheet of copy paper at the receive location.

In facsimile equipment of the type for which the present invention is adapted, the document to be scanned at the transmitting station is carried about the outer surface of a drum which is rotated relative to a scanning mechanism which is also moved longitudinally of the drum. The copy paper at the receiving station on which the image is to be produced is similarly carried on a drum that is rotated relative to the image producing mechanism which is also moved longitudinally of the drum. During such operation, the copy paper or document for equipment of this type is secured to the drum in some manner. Various clamping arrangements are disclosed for this purpose in U.S. Pat. No. 2,701,177 to Van Rennes; U.S. Pat. No. 3,618,123 to Buddendeck and U.S. Pat. No. 3,906,512 to Farlow.

U.S. Pat. No. 2,701,177 to C. Van Rennes discloses an arrangement for clamping the leading edge portion of a sheet material to the inner surface of the drum for a drum-type facsimile apparatus which requires manual manipulation of the clamping mechanism when clamping the paper to the drum and when releasing it. Once the clamping mechanism is released, the sheet material must be manipulated by the operator in some manner to remove it from the drum.

U.S. Pat. No. 3,618,123 to G. Buddendeck discloses another arrangement for clamping the leading edge portion of a sheet material to the drum for a drum-type facsimile apparatus. The Buddendeck arrangement provides for the positioning of the clamping mechanism to a release position in response to movement of a cover door to an open position. As in the case of the Van Rennes patent, the Buddendeck arrangement then requires manipulation of the sheet material by the operator in some manner to remove it from the drum.

U.S. Pat. No. 3,906,512 to J. Farlow discloses a further arrangement for clamping the leading edge portion of a sheet material to the inner surface of the drum for a drum-type facsimile apparatus. The Farlow arrangement provides for the release of the sheet material by movement of a clamp mechanism away from the sheet material, the release arrangement also serving to positively hold the drum against further rotation. As in the case of other prior art clamping mechanisms mentioned above, the operator must manipulate the sheet material in some manner following its release to remove it from the drum.

SUMMARY OF THE INVENTION

The method and apparatus of this invention provides for the clamping and release of sheet material with respect to the drum for a drum-type facsimile apparatus in a manner which simplifies the unloading of sheet material from the drum for the operator. The method of this invention for unloading the sheet material from the drum of a drum-type facsimile apparatus to which the sheet material is clamped to the drum at its leading edge portion includes the steps of releasing the clamping means; inhibiting movement of the sheet material in response to rotation of the drum while rotating the drum for a short distance to displace the clamping means relative to the sheet material and removing the sheet material by grasping the leading edge portion of the sheet material.

The apparatus of the invention for loading and unloading sheet material carried on the drum of a drum-type facsimile apparatus includes a clamping means carried on the drum; means for biasing said clamping means toward a clamping position; a first rotatable cam; a cam follower for said first cam operatively connected with said clamping means for at least a portion of the rotation of said first cam for positioning said clamping means at a non-clamping position and imparting limited rotation to said drum; sheet gripping means normally positioned from said drum and movable towards the drum for gripping said sheet material to inhibit movement of said sheet material with rotation of the drum; a second rotatable cam follower for said second rotatable cam for controlling the position of said sheet gripping means to position said sheet gripping means for gripping said sheet material at the time said first-mentioned cam follower is operatively connected with said clamping means for imparting limited rotation to said drum to allow said drum to move relative to said sheet material for a distance sufficient to free said sheet material from said clamping means.

BRIEF DESCRIPTION OF THE DRAWINGS

For a more complete understanding of the invention, reference is made to the accompanying drawings, wherein.

DESCRIPTION

This invention involves a method for unloading a piece of sheet material, such as copy paper or a document, carried on the drum of a drum-type facsimile machine wherein a clamping means is used for clamping the leading edge portion of the sheet material to the drum. Unloading of the sheet material from the drum is normally required once the drum has stopped following a transmit or receive operation of the machine. The method includes the steps of releasing the clamping means; inhibiting movement of the sheet material in response to rotation of the drum while rotating the drum for a distance and in the direction necessary to displace the clamping means relative to the leading edge portion of the sheet material and removing the sheet material by grasping the leading edge portion of the sheet material.

Figure 1:
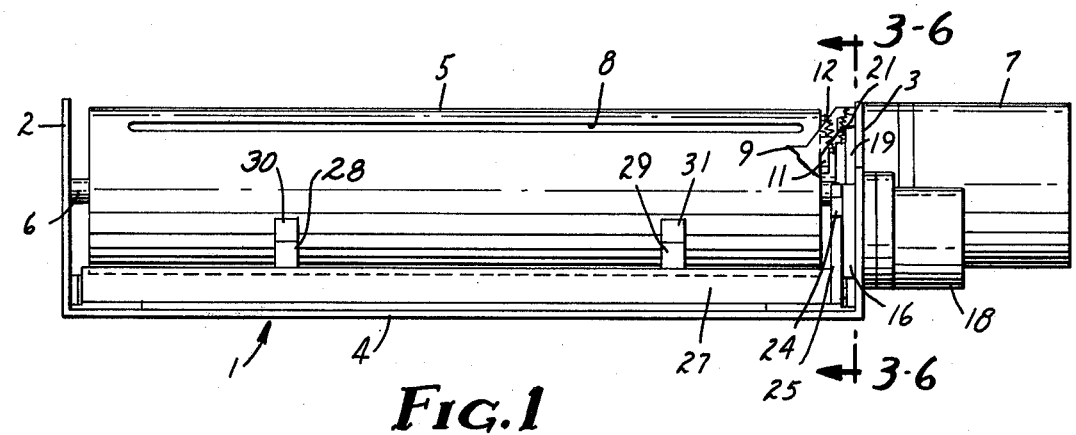
FIG. 1 is a front plan view of the portion of a facsimile apparatus embodying the invention.
Figure 2:
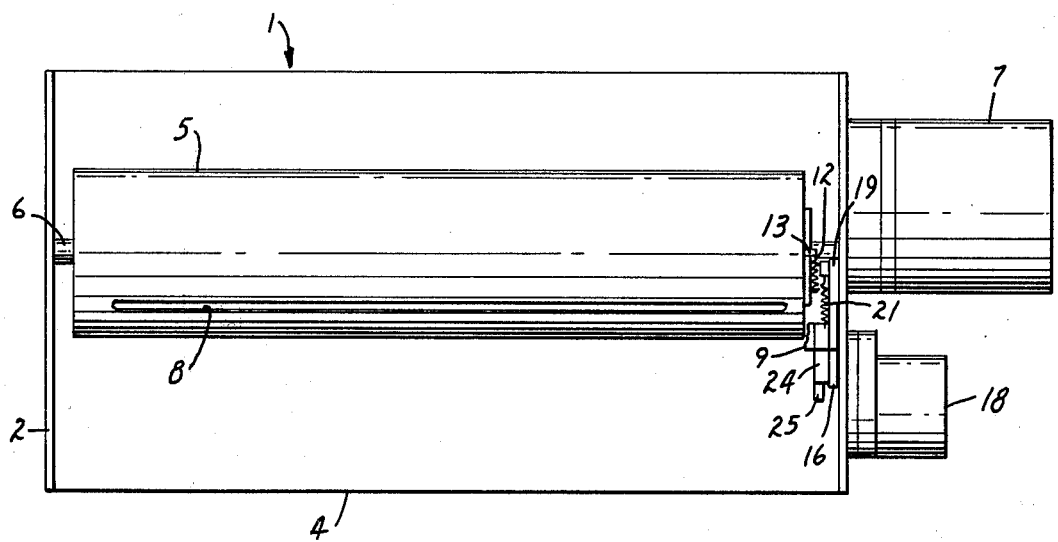
FIG. 2 is a top plan view of the apparatus of FIG. 1.

Apparatus of the invention which is operable for providing a number of the steps of the above-described method is shown in the drawings. Referring to FIG. 1, a front view of the portion of a facsimile machine embodying the invention is shown which includes a frame 1 having two side walls 2 and 3 which extend vertically from a base portion 4. A drum 5 for carrying a piece of sheet material is positioned between the side walls 2 and 3. A shaft 6 extending from the drum 5 is rotatably journaled in the side wall 2. A similar shaft extends from the other end of the drum and is connected in driving relationship to a rotatable drive means 7, such as an electrical drive motor. The drum has a narrow slot 8 which extends axially between the ends of the drum for a distance determined by the largest width of any sheet material to be used with the facsimile machine. The slot 8 allows a portion of the sheet material to be extended into the drum where it is clamped to the inner surface portion of the drum, as will be explained. A support member 9, of which only a portion is shown, extends between and is secured to the side walls 2 and 3.

Figure 4:
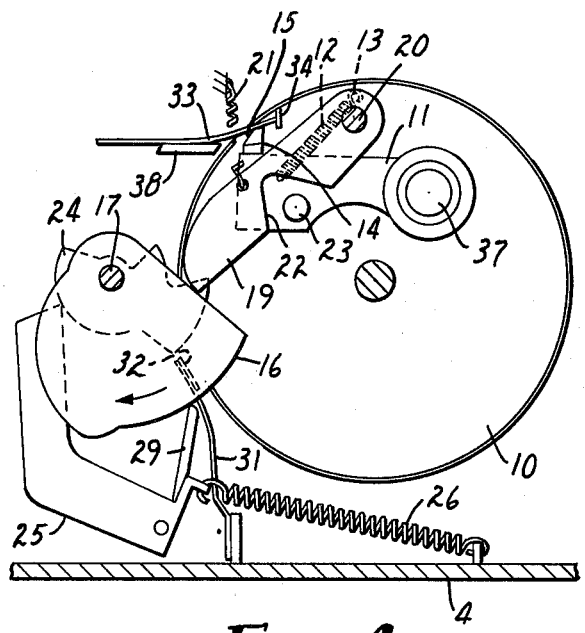

Referring to FIGS. 1 and 4, mechanism is shown for releasably holding the leading edge portion of a piece of sheet material to an inner surface portion of the drum 5. The drum is provided with an end wall 10 to which a clamp lever 11 is pivotally mounted for rotation about an axis 37 and is biased by spring 12 for movement in a clockwise direction (as viewed from the right end of drum 5). The spring 12 extends between the lever 11 and a pin 13 carried on the end wall 10. A lever (not shown), similar to lever 11, is mounted and biased in a like manner to an end wall (not shown) provided at the other end of drum 5. A clamping bar 14 extends between and is secured to the free end portions of the two levers. Openings (not shown) are provided in the two end walls of the drum 5 for passage and movement of the bar 14. The clamping bar 14 includes a member 15 that extends lengthwise of the bar and is mounted on the bar for engaging the inner surface of the drum 5 adjacent the slot 8. A piece of sheet material 33 is held to the drum 5 when its leading edge portion is inserted into the slot 8 to a position between the clamping bar 14 and the inner surface of the drum 5 with the clamping bar then moved to a clamping position. A stop member 34 is provided at the inner surface of the drum near the slot 8 to limit the degree to which the sheet material 33 is inserted into the drum. The member 15 is formed from a resilient material, such as rubber, with a plurality of raised portions (not shown) spaced along the length of the member 15 for engaging the sheet material when the clamping bar 14 is moved to a clamping position.

A rotatable cam 16 is provided for varying the position of a cam follower 19 that is pivotally mounted on the side wall 3 for movement about the axis of a shaft 20. The cam 16 is secured for rotation with a shaft 17 that is driven clockwise, as viewed in FIG. 4, by a drive means 18, such as an electrical drive motor. A spring 21 which is connected between the cam follower 19 and the support member 9 biases the cam follower for movement in a clockwise direction, as viewed in FIG. 3. A stop member (not shown) is provided on the side wall 2 and extends into the path of the cam follower 19 serving to limit the clockwise movement of the cam follower 19 when it is not engaging the cam 16. A pin 23 extends outwardly from clamping lever 11 and becomes engaged with a notch 22 in cam follower 19 dependent on the portion of cam 16 that is contacted by the cam follower 19. When the cam follower 19 is not engaging cam 16, the limited clockwise movement of follower 19 is sufficiently clear of the pin 23 to permit rotation of drum 5. The apparatus is operated in such a manner that for the time the cam 16 is driven, the drive means 7 is conditioned to permit rotation of the drum 5, so engagement of the cam follower 19 with the pin 23 is effective to impart movement to the clamping bar 14 plus limited clockwise rotation of the drum 5.

The method of the invention requires that means be provided which is effective for a period of time for gripping a piece of sheet material when carried on the drum 5 to inhibit movement of such sheet material in response to movement of the drum. Such means includes a rotatable cam 24 which is secured with cam 16 to the shaft 17 that is driven clockwise, as viewed in FIG. 3, by the drive means 18. The cam 24 is provided for altering the position of the cam follower 25 which is pivotally mounted on the base portion 4. The follower 25 is biased for clockwise movement, as viewed in FIG. 3, toward the cam 24 by spring 26 mounted between the cam follower 25 and the base 4. Secured to or formed as an integral part of the cam follower 25 is a bar 27 which extends parallel to the drum 5 and is pivotally mounted to the base 4 near the side wall 2. The bar 27 pivots with respect to the same axis of rotation as the cam follower 25. Spaced along and secured to or formed as an integral part of the bar 27 are two arms 28 and 29. The arms 28 and 29 extend generally toward the drum 5.

Two sheets gripping arms 30 and 31, each having one end fixedly secured either directly or indirectly to the base 4, extend upwardly from the base 4. The arm 30 is positioned and formed so a portion of the arm is opposite the arm 28 for engagement by the tip of arm 28 when the cam follower 25 and bar 27 rotate clockwise. The arm 31 is similarly positioned and formed with respect to the arm 29. The arms 30 and 31 each have a free end portion. A piece of gripping material 32, such as rubber, is secured on the drum side of the free end portion of arm 31. A similar piece of material is also secured in a like manner to the arm 30. The arms 30 and 31 are formed of a spring material and, when in an unflexed position, the pieces of gripping material are positioned a short distance from the drum. During a portion of the rotation of cam 24, the arms 28 and 29 contact the arms 30 and 31, respectively, to flex them and bring the gripping material into engagement with sheet material when carried on the drum 5. Since the arms 30 and 31 are formed of a spring material, they return to an unflexed position when the arms 28 and 29 are positioned away from the arms 30 and 31.

Figure 3:
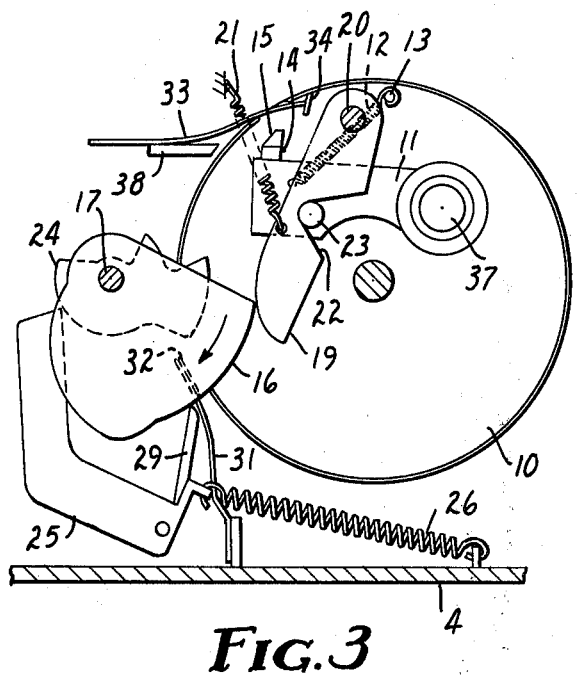
FIGS. 3-6, inclusive, are enlarged end views of the apparatus of FIG. 1 taken substantially along the line 3-6 depicting different operative positions for the apparatus.

The operation of the apparatus will now be described. The outer cover for the facsimile machine, a portion of which is shown at 38, serves as a guide for inserting the sheet material into the machine in a generally horizontal plane. At the time the leading edge portion of a piece of sheet material 33 is inserted into the drum 5 via the slot 8, the apparatus is generally positioned, as shown in FIG. 3, wherein the pin 23 is fully engaged in the notch 22 of the cam follower 19 causing the clamping bar 14 to be positioned away from the inner surface of the drum. The cam follower 25 is then engaging cam 24 at a point which positions the arms 28 and 29 out of contact with the sheet gripping arms 30 and 31. The drive means 18 for cams 16 and 24 is then operated to establish the position of the apparatus, as shown in FIG. 4, wherein the cam follower 19 is clear of the cam 16 and has moved clockwise into engagement with the stop member (not shown) provided on the side wall 3 allowing the clamping bar 14 to move clockwise to bring the member 15 to a position where the sheet material 33 is held between member 15 and the inner surface of the drum 5. Operation of the drive means 18 is then discontinued. The drive means 7 is then operated to rotate the drum 7 clockwise with the sheet material 33 carried on the drum.

The facsimile machine is then in condition to operate in the receive or transmit mode as required and, upon completion of such operation, the drive means 7 is operated to place the drum 5 at the general position shown in FIG. 4 with the drive means 7 then conditioned to allow the drum 5 to move freely. The drive means 18 for cams 16 and 24 is then operated to rotate the cams 16 and 24 to the position shown in FIG. 5. The cam follower 19 is then engaged by the cam 16 and a point on cam 24 has been reached where a few degrees of further rotation of cam 24 will allow the cam follower 24 to rotate clockwise an amount sufficient to bring the arms 28 and 29 into engagement with arms 30 and 31, respectively, to carry the gripping material at the free end portion of arms 30 and 31 into engagement with the sheet material 33 on drum 5. The position of cam 24 due to such further movement is shown in FIG. 6 together with the positioning of arm 31 as has been described with the gripping material 32 pressed against the sheet material 33.

Figure 5:
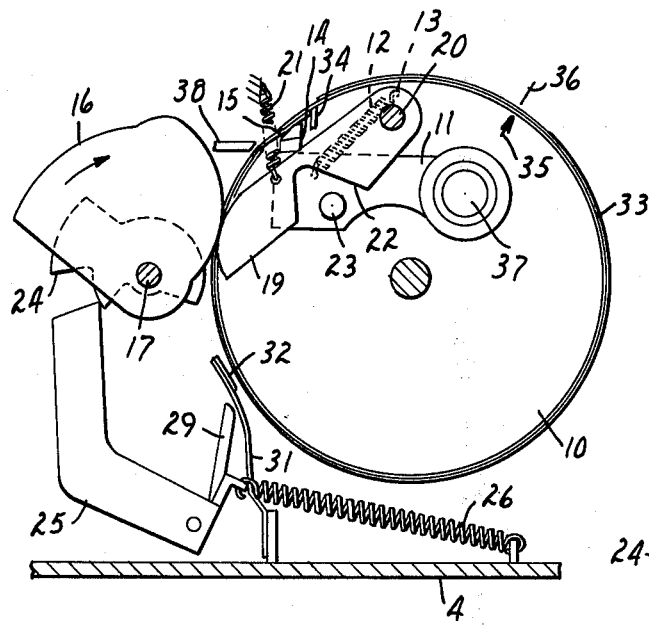
Figure 6:
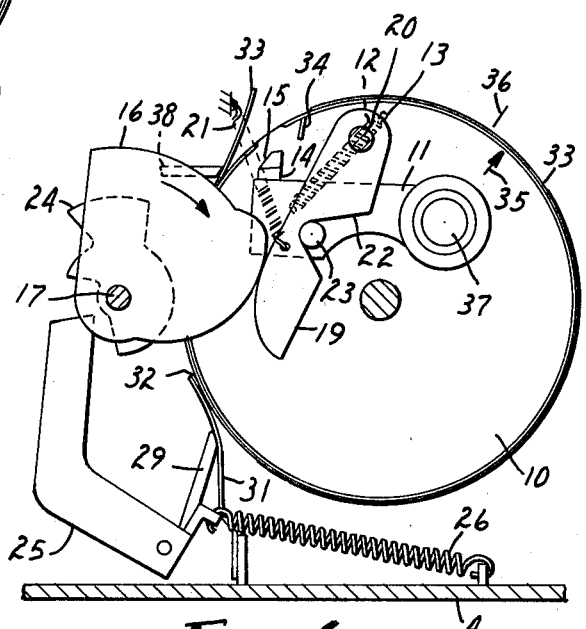

The further clockwise rotation of cam 16 from the position shown in FIG. 5 to that shown in FIG. 6 also causes some counterclockwise rotation of cam follower 19 bringing the notch of cam follower 19 into engagement with the pin 23 of clamping lever 11 resulting in some counter-clockwise movement of the clamping lever 11 about its axis of rotation to carry the clamping bar 14 away from engagement with the sheet material 33. In addition, clockwise rotation of the drum 5 for a few degrees from the position shown in FIG. 5 occurs. An arrow 35 and index mark 36 are shown in FIGS. 5 and 6 to show the clockwise displacement of drum 7 which occurs. The sheet material 33 is engaged by the gripping material carried on the free end portions of arms 30 and 31, during the time the drum rotates the few degrees. With the movement of the sheet material with the drum inhibited in this manner, the slot 8 in the drum is moved relative to the end portion of the sheet material to position the end of the sheet material at the slot 8. Due to the inherent resiliency of the sheet material, the free end portion of the sheet material moves away from the drum surface and assumes the position shown in FIG. 6. Operation of the drive means 18 is continued until the next high point on cam 24 operates on the cam follower 25 to rotate it counterclockwise to carry arms 28 and 29 away from the paper clamping arms 30 and 31 to release the sheet material 33. The operator can then readily grasp the free leading edge portion of the sheet material and withdraw it from its position around the drum. The apparatus is then in a position for receiving the next piece of sheet material to be positioned for clamping to the drum.

While the invention has been particularly shown and described with reference to a single preferred embodiment thereof, it will be understood by those skilled in the art that various changes in form and detail may be made therein without departing from the spirit and scope of the invention.

What is claimed is:

1. In a facsimile machine having a rotatable drum and apparatus for loading sheet material onto the drum and unloading the sheet material from the drum comprising:
    a clamping means carried by the drum and movable between a clamped position at which the sheet material is held at an edge portion to the drum by the clamping means and an unclamped position at which the clamping means is spaced from the drum;
    means for engaging said clamping means for moving said clamping means from said clamped position to said unclamped position and imparting limited rotation to the drum when so moving said clamping means;
    gripping means movable between a position spaced from the drum and a position in contact with the sheet material carried on the drum for inhibiting movement of the sheet material in response to movement of the drum;
    means for engaging said gripping means for moving said gripping means into contact with the sheet material; and
    means for providing time coordinated operation of said last-mentioned and said means for engaging said clamping means to move said gripping means into contact with the sheet material before said limited rotation is imparted to the drum during the time said clamping means is moved to an unclamped position causing said limited rotation imparted to the drum to displace said edge portion of said sheet material relative to said clamping means allowing the inherent resiliency of said sheet material to move said edge portion away from the drum and said clamping means, said time coordinated operation then positioning said means for engaging said gripping means to place said gripping means at a position spaced from the drum whereby said sheet material can be grasped at said edge portion for manual unloading of said sheet material from the drum while said gripping means is at a position spaced from the drum.

2. The apparatus according to claim 1 wherein said clamping means is pivotally mounted on said drum and said means for engaging said clamping means includes a cam and cam follower.

3. The apparatus according to claim 2 wherein said cam is a rotatable cam.

4. The apparatus according to claim 1 wherein said means for engaging said gripping means includes a cam and cam follower.

5. The apparatus according to claim 4 wherein said cam is a rotatable cam.

6. The apparatus according to claim 1 wherein said clamping means is pivotally mounted on said drum; said means for engaging said clamping means includes a first cam follower; said means for engaging gripping means includes a second cam follower and said means for providing time coordinated operation includes a first cam for said first cam follower, a second cam for said second cam follower, said first and second cams having a common drive means.

7. The apparatus according to claim 6 wherein said first and second cams are rotatable cams.

* * * * *